US009866679B2

(12) United States Patent
Ishikawa et al.

(10) Patent No.: US 9,866,679 B2
(45) Date of Patent: Jan. 9, 2018

(54) COMMUNICATION APPARATUS, COMMUNICATION CONTROL METHOD, AND NON-TRANSITORY COMPUTER-READABLE RECORDING MEDIUM

(71) Applicant: KYOCERA Corporation, Kyoto (JP)

(72) Inventors: Shuji Ishikawa, Yokohama (JP); Yasuhiro Ito, Tokyo (JP); Tomoya Kamijo, Yokohama (JP); Hidetaka Hayashi, Yokohama (JP); Kohei Michigami, Yokohama (JP); Kazuo Onishi, Yokohama (JP); Kazuya Chito, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/422,548

(22) Filed: Feb. 2, 2017

(65) Prior Publication Data
US 2017/0223172 A1 Aug. 3, 2017

(30) Foreign Application Priority Data

Feb. 3, 2016 (JP) .................................. 2016-019123

(51) Int. Cl.
*H04W 48/02* (2009.01)
*H04M 1/725* (2006.01)
*H04W 84/12* (2009.01)
*H04W 84/04* (2009.01)

(52) U.S. Cl.
CPC ....... *H04M 1/72577* (2013.01); *H04W 48/02* (2013.01); *H04W 84/042* (2013.01); *H04W 84/12* (2013.01)

(58) Field of Classification Search
CPC ..... H04W 4/008; H04W 48/18; H04W 88/06; H04W 72/04; H04W 76/02; G06F 21/31; G06F 21/44; G06F 21/6227; G06F 2221/2117; G06F 8/65; G06F 17/30867
See application file for complete search history.

(56) References Cited

U.S. PATENT DOCUMENTS

2014/0141718 A1* 5/2014 Stromberg ............. G06Q 20/32
455/41.1
2015/0181403 A1 6/2015 Tanaka et al.
2016/0292403 A1* 10/2016 Gong .................... H04L 63/101

FOREIGN PATENT DOCUMENTS

| JP | 2014-022986 A | 2/2014 |
|---|---|---|
| JP | 2014-146996 A | 8/2014 |
| JP | 2015-162701 A | 9/2015 |

OTHER PUBLICATIONS

An Office Action; "Notice of Reasons for Rejection," issued by the Japanese Patent Office dated Jul. 12, 2016, which corresponds to Japanese Patent Application No. 2016-019123 and is related to the present application; with English language Concise Explanation.

(Continued)

*Primary Examiner* — Diane Mizrahi
(74) *Attorney, Agent, or Firm* — Studebaker & Brackett PC

(57) ABSTRACT

A communication apparatus includes a controller that prohibits data communication by default, receives a request for data communication from an application, and permits data communication of the application in accordance with an ID of a group to which the application issuing the request belongs.

17 Claims, 13 Drawing Sheets

(56) References Cited

OTHER PUBLICATIONS

An Office Action; "Final Reason for Rejection," issued by the Japanese Patent Office dated Oct. 11, 2016, which corresponds to Japanese Patent Application No. 2016-019123 and is related to the present application; with English language Concise Explanation.

An Office Action; "Notice of Reasons for Rejection," issued by the Japanese Patent Office dated Jan. 10, 2017, which corresponds to Japanese Patent Application No. 2016-215473 and is related to the present application; with English language Concise Explanation.

Nobuo Hayashi; "iPhone concierge, which accommodates selfish requests with just a finger operation"; Mac Fan; Jul. 1, 2010; pp. 184-185, vol. 18 No. 7; Mainichi Communications Corporation; Japan.

"Phone used as a Wi-Fi terminal"; Mac Fan; Sep. 1, 2008; p. 39, vol. 16 No. 9; Mainichi Communications Corporation; Japan.

Kawabata et al.; "A Privilege and Responsibility Separation Framework for Applications and 3rd Party Modules in Smartphone"; DICOMO 2012 Symposium; Jul. 2012; pp. 2202-2210.

Kumagaya; "Special issue 3, Be careful here on Android OS, the important point of the security measure"; NIKKEI Software; Jun. 2012; pp. 80-95.

Kato et al.; "Protecting Assets by Dynamic Approval System Based on Android Threat Analysis"; FIT2013 (Forum on Information Technology 2013); 2013; pp. 235-240; vol. 4.

Kato et al.; "A Dynamic Countermeasure Method to Android Malware by User Approval"; IPSJ SIG Technical Report; May 9, 2013; pp. 1-6; vol. 2013-CSEC-61 No. 6.

An Office Action issued by the Japanese Patent Office on Aug. 1, 2017, which corresponds to Japanese Patent Application No. 2016-019123 and is related to U.S. Appl. No. 15/422,548; with English language concise explanation.

\* cited by examiner

COMMUNICATION APPARATUS, COMMUNICATION CONTROL METHOD, AND NON-TRANSITORY COMPUTER-READABLE RECORDING MEDIUM

CROSS-REFERENCE TO RELATED APPLICATIONS

This application claims priority to and the benefit of Japanese Patent Application No. 2016-019123 filed on Feb. 3, 2016, the entire contents of which are incorporated herein by reference.

TECHNICAL FIELD

This disclosure relates to a communication apparatus, a communication control method, and a non-transitory computer-readable recording medium.

BACKGROUND

Communication apparatuses such as mobile terminals that can perform data communication have been proposed. Some communication apparatuses are configured so that data communication by applications running on the communication apparatus is collectively permitted or collectively prohibited. On the other hand, some communication apparatuses are configured to allow permission or prohibition of data communication to be set for each application. The setting of whether to permit of prohibit data communication for each application may be made by the user. The number of applications typically running on a communication apparatus, however, is increasing. As a result, the user cannot keep up with data communication of each individual application.

SUMMARY

A communication apparatus according to one of the embodiments of this disclosure includes:
a controller configured to
prohibit data communication by default;
receive a request for data communication from an application; and
permit data communication of the application in accordance with an ID of a group to which the application issuing the request belongs.

A communication control method according to one of the embodiments of this disclosure includes:
on a communication apparatus,
prohibiting data communication by default;
receiving a request for data communication from an application; and
permitting data communication of the application in accordance with an ID of a group to which the application issuing the request belongs.

A non-transitory computer-readable recording medium according to one of the embodiments of this disclosure includes computer program instructions, which when executed by a computer functioning as a communication apparatus, cause the computer to:
prohibit data communication by default;
receive a request for data communication from an application; and
permit data communication of the application in accordance with an ID of a group to which the application issuing the request belongs.

A communication apparatus according to one of the embodiments of this disclosure includes:
a controller configured to
permit data communication by default;
receive a request for data communication from an application; and
prohibit data communication of the application in accordance with an ID of a group to which the application issuing the request belongs.

A communication control method according to one of the embodiments of this disclosure includes:
on a communication apparatus,
permitting data communication by default;
receiving a request for data communication from an application; and
prohibiting data communication of the application in accordance with an ID of a group to which the application issuing the request belongs.

A non-transitory computer-readable recording medium according to one of the embodiments of this disclosure includes computer program instructions, which when executed by a computer functioning as a communication apparatus, cause the computer to:
permit data communication by default;
receive a request for data communication from an application; and
prohibit data communication of the application in accordance with an ID of a group to which the application issuing the request belongs.

BRIEF DESCRIPTION OF THE DRAWINGS

In the accompanying drawings.

DETAILED DESCRIPTION

Embodiment 1

The following describes a communication apparatus according to one of the embodiments in detail with reference to the drawings. The communication apparatus according to this embodiment may be a mobile device, such as a mobile phone or a smartphone. The communication apparatus according to this embodiment, however, is not limited to being a mobile device and may be any of a variety of electronic devices that perform data communication, such as a desktop PC (Personal Computer), a notebook PC, a tablet PC, a household appliance, an industrial device (FA (Factory Automation) device), a dedicated terminal, or the like.

Apparatus Structure

Figure 1:
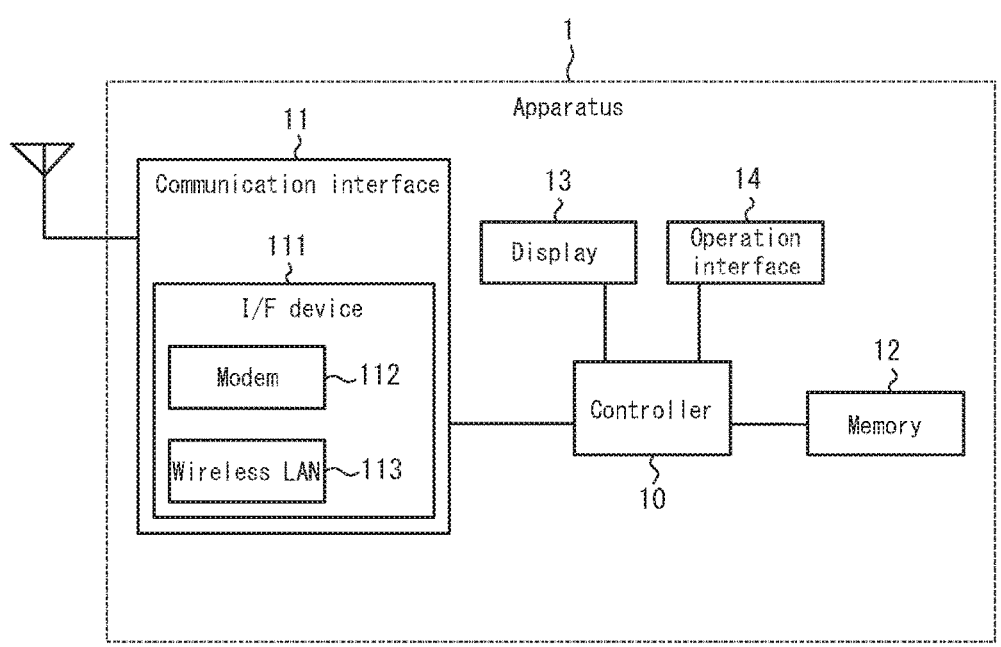
FIG. 1 is a functional block diagram schematically illustrating an example of the structure of a communication apparatus according to Embodiment 1.

FIG. 1 is a functional block diagram schematically illustrating an example of the structure of a communication apparatus 1 according to this embodiment. As illustrated in FIG. 1, the communication apparatus 1 includes a controller 10, a communication interface 11, a memory 12, a display 13, and an operation interface 14. The controller 10 is connected to and controls the communication interface 11, memory 12, display 13, and operation interface 14.

The controller 10 may be configured by a processor, microcomputer, or the like that can execute an operating system (OS) and application software (application). The OS may, for example, be Android® (Android is a registered trademark in Japan, other countries, or both). The application is described below.

The communication interface 11 is a communication interface that performs cellular communication, wireless LAN (Local Area Network) communication, or the like and is provided with an interface (I/F) device 111. The I/F device 111 includes a modem 112 and a wireless LAN device 113. The communication interface 11 is connected to a network such as the Internet using the I/F device 111 and performs data communication with the network. As a result, the communication apparatus 1 can perform data communication with the network. The communication interface 11 is connected to the controller 10 and acquires data to be output to the network from the controller 10. The controller 10 selects data to output to the communication interface 11 based on filtering. The filtering is described below. The controller 10 also acquires data received from the network from the communication interface 11.

When connecting to the network with a cellular communication method, a pay-as-you-go fee structure is typically adopted, with the communication fee increasing as the amount of transmitted data (packets) increases. On the other hand, when connecting to the network with a method such as wireless LAN communication, such a fee structure is not typical.

The memory 12 may, for example, be configured by a semiconductor memory. A variety of information or data, along with programs for applications, the OS, and the like executed by the controller 10, are stored in the memory 12. The controller 10 acquires and executes programs stored in the memory 12. The controller 10 stores data generated by executing the programs in the memory 12. The memory 12 may also function as a working memory.

The display 13 displays characters, images, objects for operation, pointers, and the like based on information acquired from the controller 10. The display 13 may, for example, be a display device such as a liquid crystal display, an organic EL (Electroluminescence) display, an inorganic EL display, or the like, but is not limited to these examples.

The operation interface 14 may be configured by physical keys such as numeric keys, a touchpad, a touch panel, or the like. In accordance with the content of input acquired from the operation interface 14, the controller 10 performs actions such as moving the pointer or the like displayed on the display 13 and selecting an object for operation.

Figure 2:
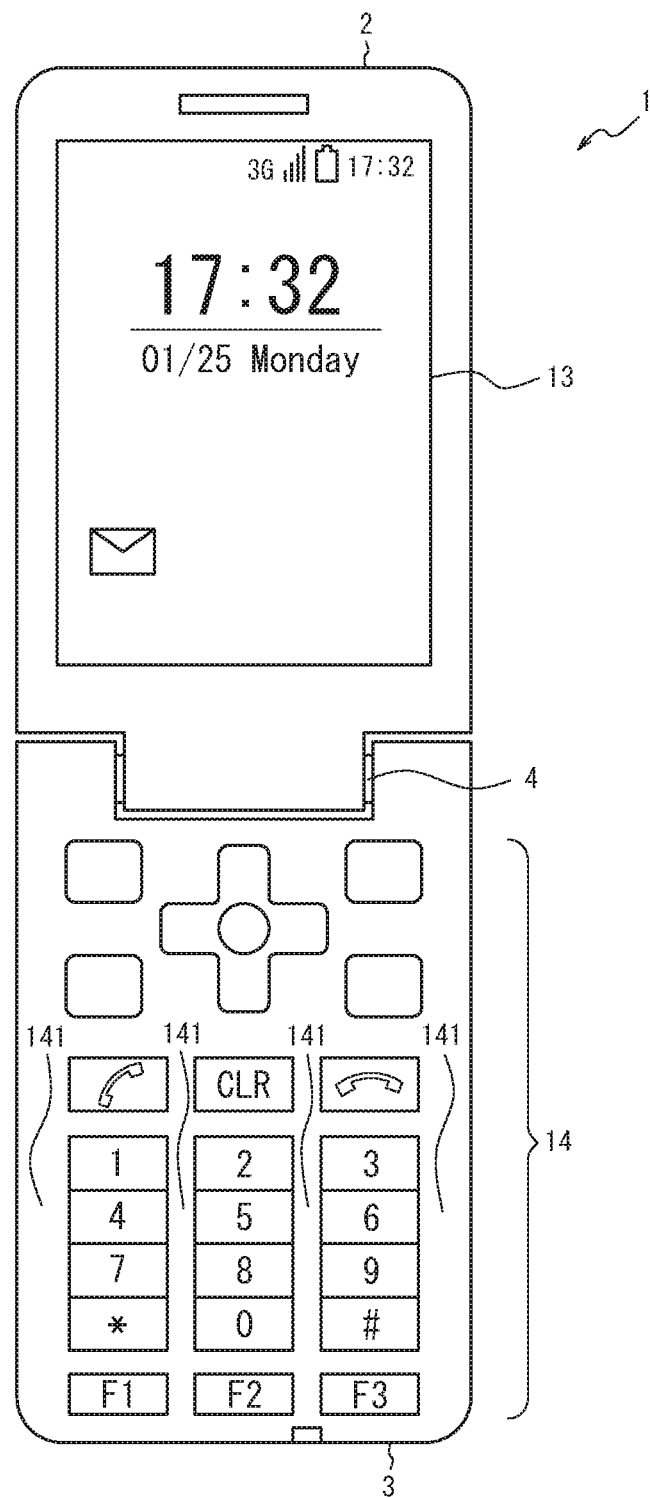
FIG. 2 is an external view of an example of the communication apparatus according to Embodiment 1.

FIG. 2 is an external view of an example of the communication apparatus 1 according to this embodiment. As illustrated in FIG. 2, the communication apparatus 1 according to this embodiment is a folding feature phone (flip phone, clamshell phone, or the like). In the communication apparatus 1, an upper housing 2 and a lower housing 3 are connected by a hinge 4 so as to be rotatable. The upper housing 2 is provided with the display 13, and the lower housing 3 is provided with the operation interface 14. The operation interface 14 is provided with physical keys, such as numeric keys, and with a touchpad 141 at a location where no physical key is provided. The communication apparatus 1 for example receives a selection operation on an object for operation using a physical key or receives a movement operation of a pointer or the like using the touchpad 141.

Applications

Applications are installed on the communication apparatus 1 and stored in the memory 12 so as to be executable by the controller 10. When the applications are installed on the communication apparatus 1, a unique user identifier (hereinafter, also abbreviated as UID) is allocated to each application. Each application is executed by the controller 10 as a process associated with a UID on the OS.

When executed by the controller 10, an application accesses resources such as the file system. If each application were to access resources without restriction, the resource areas used by the applications would overlap, which might prevent the applications from executing properly. Therefore, access to resources is restricted by the UIDs associated with processes running on the OS, so that applications do not affect each other with their use of resources. In other words, the resources that can be accessed by each process are restricted to resources of the process associated with the same UID.

Each application is further allocated a group identifier (hereinafter, also abbreviated as GID or group ID). The GID identifies the group to which the unique UID allocated to each application belongs. One UID alone may belong to one group, or a plurality of UIDs may belong to one group. When an application is executed as a process associated with a UID, the process is also associated with a GID. The restricted resources that can be accessed by each process may be broadened to include not only resources of the process associated with the same UID, but also resources of processes associated with the same GID.

Applications are executed in the foreground or the background. A state in which an application is executed in the foreground is, for example, a state in which the execution status is displayed on the display 13 to allow user confirmation, or a state in which the user can perform operations with the operation interface 14. A state in which an application is executed in the background is, for example, a state in which the execution status is not displayed on the display 13 and the user cannot perform operations, or a state in which the application is running without intent by the user.

Control of Data Communication

The applications executed by the controller 10 perform data communication with a network, such as the Internet, using the communication interface 11. As described above, the applications are each executed as a process associated with a UID and a GID on the OS. The UID and the GID are also associated with the data transmitted by the application. By determining whether to permit or prohibit (restrict) transmission of data based on the UID or the GID associated with the data, the controller 10 can control whether to permit or prohibit data communication for the data transmitted by each application. As a general rule, in the following explanation of this embodiment, data communication refers to data communication between the communication interface 11 and the network.

Figure 3:
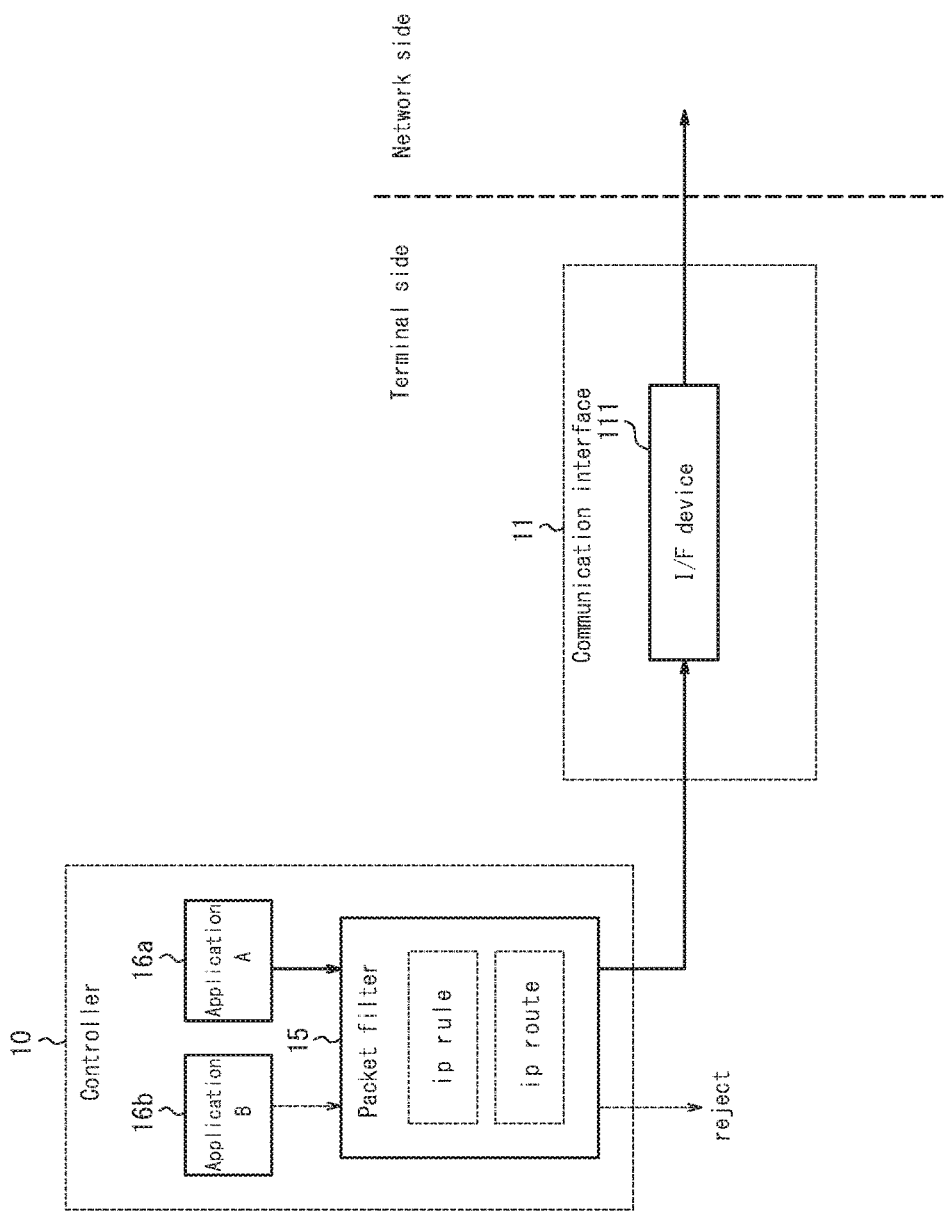
FIG. 3 is a block diagram illustrating an example of the flow of data according to Embodiment 1.

FIG. 3 is a block diagram illustrating an example of the flow of data according to this embodiment. In FIG. 3, the controller 10 and the communication interface 11 are provided on the terminal side. The communication interface 11 is connected to the network and performs data communication with the network.

In FIG. 3, the controller 10 executes an application A 16a and an application B 16b as processes on the OS. The applications executed by the controller 10 request data communication with the network as necessary. Requesting data communication is also referred to as issuing a request of data communication. For example, the application A 16a requests data transmission to the network. In this case, the data to transmit from the application A 16a to the network are input into a packet filter 15 operating in the controller 10. Similarly, data to transmit from the application B 16b to the network are input into the packet filter 15 from the application B 16b.

The packet filter 15 filters data from the controller 10 to the network. The filtering is processing to determine whether to permit or prohibit transmission of data requested by an application based on set filtering conditions. The filtering conditions for example include an ip_rule or an ip_route. These filtering conditions are stored in the memory 12 and referred to by the packet filter 15. Hereinafter, operations to set the filtering conditions are assumed to include operations to store the filtering conditions in the memory 12. The filtering conditions may be held in the controller 10 without being stored in the memory 12.

The ip_rule for example includes a condition for determining whether to transmit data whose source is X to the network. The ip_route for example includes a condition for determining the route (relay router or the like) for transmitting data for which the destination is designated as Y to the network.

In FIG. 3, the flow of data transmitted from the application A 16a is indicated by a solid arrow, whereas the flow of data transmitted from the application B 16b is indicated by a dashed arrow. Of these two, the data transmitted from the application A 16a are transmitted to the communication interface 11 without transmission being prohibited by the filtering in the packet filter 15. On the other hand, the data transmitted from the application B 16b are prohibited by the filtering in the packet filter 15 and are not transmitted to the communication interface 11. This operation is indicated by the dashed arrow in FIG. 3 pointing towards the word "reject".

The data that pass through the packet filter 15 (in the case of FIG. 3, the data transmitted from the application A 16a as indicated by the solid arrow) are input into the communication interface 11. The communication interface 11 transmits the data to the network using the I/F device 111. When transmitting the data to the network, the communication interface 11 may use cellular communication by the modem 112, wireless LAN communication by the wireless LAN device 113, or another communication method.

Filtering

In this embodiment, it is determined whether to permit or prohibit data communication for data transmitted from an application based on the GID that specifies the group belonged to by the UID allocated to the application that is the source of data transmission. Hereinafter, data that are transmitted from an application to which X is allocated as the UID (hereinafter, also referred to as application with a UID of X) are also referred to as data with a UID of X. When the GID that specifies the group to which the UID of X belongs is Y, the GID of Y is allocated to the application with the UID of X. Hereinafter, an application with Y allocated as the GID is also referred to as an application with a GID of Y. Data transmitted by the application with a GID of Y are also referred to as data with a GID of Y. The filtering condition used to filter data with a GID of Y is also referred to as the filtering condition for data with a GID of Y.

The packet filter 15 for example has a filtering condition that only allows data communication for data transmitted from an application with a GID of 1. The filtering condition may also be a combination of a plurality of conditions.

The following describes the sequence for data communication when filtering according to this embodiment is performed. The filtering according to this embodiment is assumed to determine whether to permit or prohibit data communication for data transmitted by an application running in the background. The following description of filtering according to this embodiment is based on this assumption.

The filtering according to this embodiment has a set filtering condition such that data communication is prohibited by default (hereinafter, also referred to as default condition to prohibit communication). By the default condition to prohibit communication being set, all data communication is prohibited unless another filtering condition is further set. The default condition to prohibit communication may be set when the communication apparatus 1 is shipped or when the communication apparatus 1 is initialized. In other words, in this embodiment, the "default" refers to the standard operation that is set in advance at a predetermined time (for example, when the communication apparatus 1 is shipped, when the communication apparatus 1 is initialized, or the like).

In the filtering conditions used in this embodiment, in order to perform necessary data communication, a condition to permit data communication (hereinafter, also referred to as condition to permit communication) is set in addition to the default condition to prohibit communication. In this case, the condition to permit communication takes priority over the default condition to prohibit communication.

Figure 4:
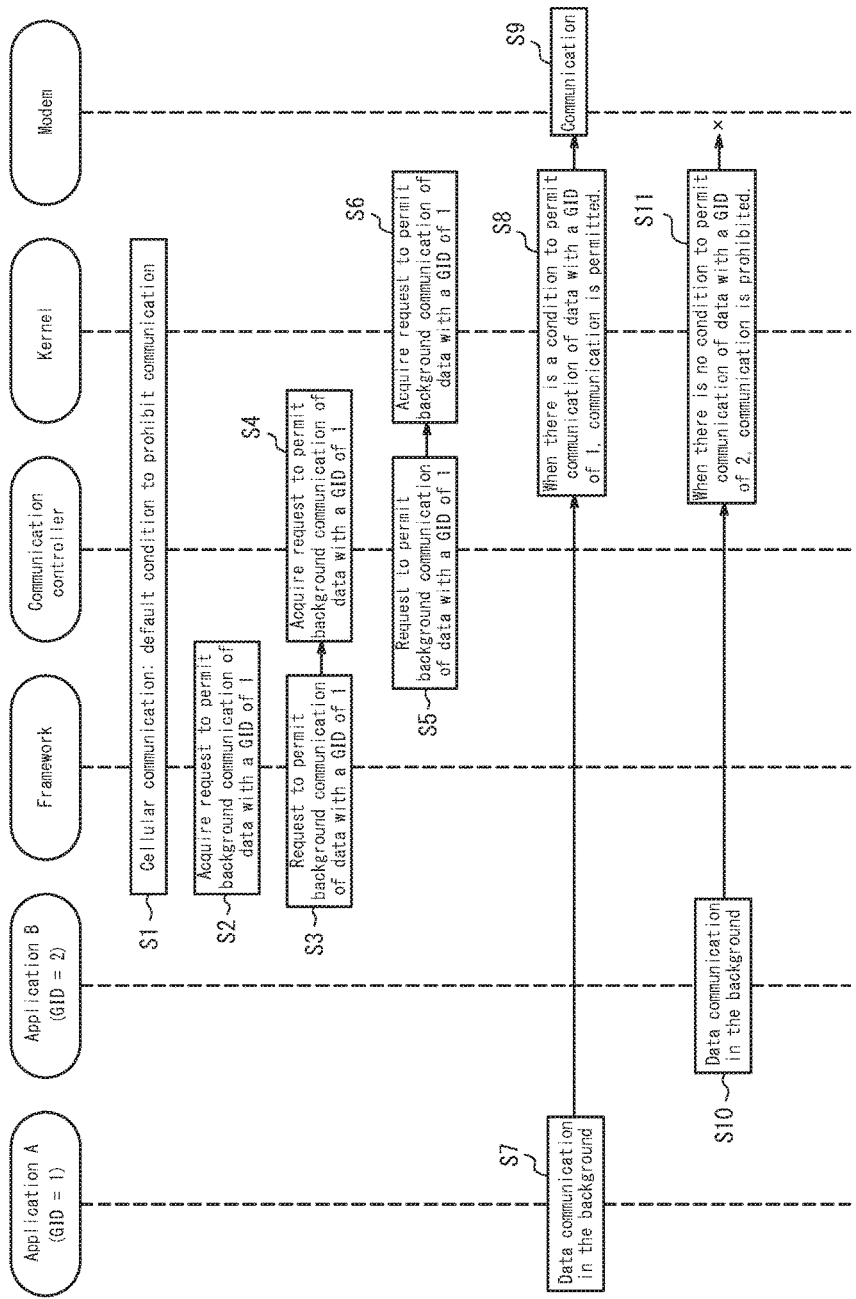
FIG. 4 illustrates the sequence of filtering according to Embodiment 1.

FIG. 4 illustrates the sequence of filtering according to this embodiment. FIG. 4 illustrates the sequence for the application A 16a, application B 16b, framework, communication controller, kernel, and modem 112.

As described above, the modem 112 is hardware that functions as a communication interface to perform cellular communication. In FIG. 4, data communication by cellular communication using the modem 112 is described, but the modem 112 may be replaced by another I/F device 111, such as the wireless LAN device 113, and data communication may be performed by another communication method.

The kernel, communication controller, and framework are software executed by the controller 10.

The framework is software that includes a functional group for causing applications to operate on the OS. In general, by combining portions of the functional group prepared on the framework, the functions of each application can be implemented.

The kernel is software that forms the nucleus of the OS. Based on processing of the applications and other software, the kernel manages processing on the communication interface 11 and other hardware to allow use of the hardware functions.

The communication controller is a daemon program that executes network related processing and executes processing that connects the framework and the kernel. In particular, the communication controller processes data to allow the kernel to use the functions of the communication interface 11. In this embodiment, the communication controller outputs, to the kernel, conditions for the kernel to determine whether to permit or prohibit data output to the communication interface 11.

In this embodiment, the filtering is described as being performed by the packet filter 15. The packet filter 15 is a virtual processing unit, and the actual filtering is performed by the communication controller and the kernel.

The application A 16a and the application B 16b are processes running on the OS. In FIG. 4, the application A 16a is an application with a GID of 1, and the application B 16b is an application with a GID of 2.

The following describes the sequence illustrated in FIG. 4. In the case of data transmission by an application running in the background, data communication by cellular communication is prohibited by default (step S1). In other words, as a filtering condition, a default condition to prohibit communication is set for data transmitted from an application running in the background. In FIG. 4, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a GID of 1 in the case of an application running in the background (hereinafter, also referred to as request to permit communication of data with a GID of 1) (step S2). The framework then outputs the request to permit communication of data with a GID of 1 to the communication controller (step S3).

The communication controller acquires the request to permit communication of data with a GID of 1 (step S4). Next, the communication controller outputs the request to permit communication of data with a GID of 1 to the kernel (step S5).

The kernel acquires the request to permit communication of data with a GID of 1 (step S6). With the above operations in steps S3 to S6, the request to permit communication of data with a GID of 1 is conveyed to the kernel. In other words, as a filtering condition, a condition to permit communication for data with a GID of 1 is set.

Next, when the application A 16a issues a request for data communication while running in the background (step S7), the kernel permits the data communication, since the kernel recognizes that the condition to permit communication for data with a GID of 1 is set (step S8). The modem 112 then performs data communication to transmit the data with a GID of 1 to the network (step S9).

Conversely, when the application B 16b with a GID of 2 requests data communication while running in the background (step S10), the kernel recognizes that a condition to permit communication for data with a GID of 2 is not set. Therefore, the kernel prohibits data communication based on the default condition to prohibit communication (step S11).

Sequence of Data Transmission from an Application

Figure 5:
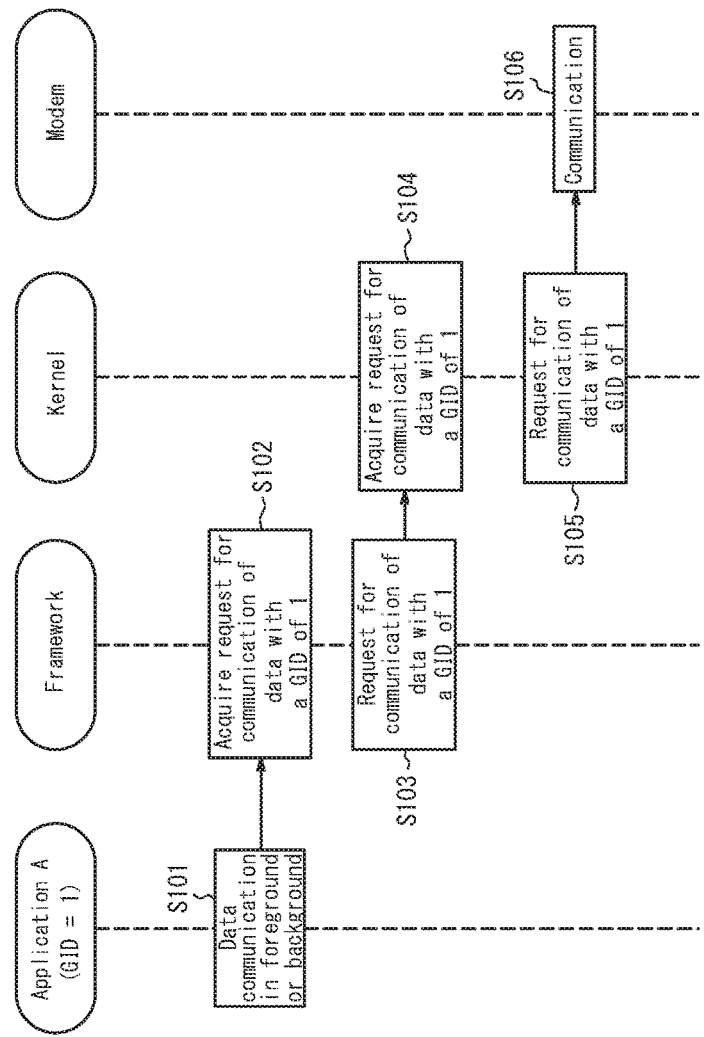
FIG. 5 illustrates an example of a sequence for transmitting data from an application.

In steps S7 to S9 of FIG. 4, the case of an application requesting data communication and the modem 112 performing data communication has been described. With reference to FIG. 5, the following describes this sequence in greater detail. FIG. 5 illustrates the sequence for the application A 16a, framework, kernel, and modem 112. A description of the application A 16a, framework, kernel, and modem 112 is the same as in FIG. 4 and is therefore omitted.

Whether running in the foreground or the background, the application A 16a outputs a request, to the framework on the OS on which the application A 16a is running, for data communication of data (data with a GID of 1) transmitted from the application A 16a (hereinafter, also referred to as request for communication of data with a GID of 1) (step S101).

The framework acquires the request for communication of data with a GID of 1 (step S102). Next, the framework outputs the request for communication of data with a GID of 1 to the kernel (step S103).

The kernel acquires the request for communication of data with a GID of 1 (step S104). Next, the kernel outputs data based on the request for communication of data with a GID of 1 to the modem 112 (step S105). The modem 112 then performs data communication to transmit the data with a GID of 1 to the network (step S106).

With the operations of the sequence illustrated in FIG. 5 as described above, data transmitted from the application are output to the communication interface 11 and are transmitted to the network.

Filtering according to Embodiment 1 has been described above. With the filtering according to this embodiment, permission for data communication can be set by designating the GID. A different type of filtering could allow permission for data communication to be set by designating the UID. Since the GID indicates a broader range than the UID, however, a method that designates the GID allows permission for data communication by an application to be set more easily than a method that designates the UID.

In this embodiment, data communication may be permitted by default for functions that are necessary to transmit the data for which data communication is permitted. The functions for which data communication is permitted by default may, for example, be a tunneling function of a Virtual Private Network (VPN), a name resolving function of a Domain Name System (DNS), or a tethering function. Permission for data communication related to these functions may be restricted to operations intended by the user. The condition for permitting data communication for these functions may be set as a filtering condition that takes priority over the default condition to prohibit communication.

Embodiment 2

Filtering according to Embodiment 2 is described below. The filtering conditions used in the filtering according to this embodiment include a condition to permit data communication for all data by default (hereinafter, also referred to as default condition to permit communication). In addition to permitting data communication for all data in this way, a condition to prohibit data communication for data with a GID designated by the user (hereinafter, also referred to as condition to prohibit communication) is further set.

Figure 6:
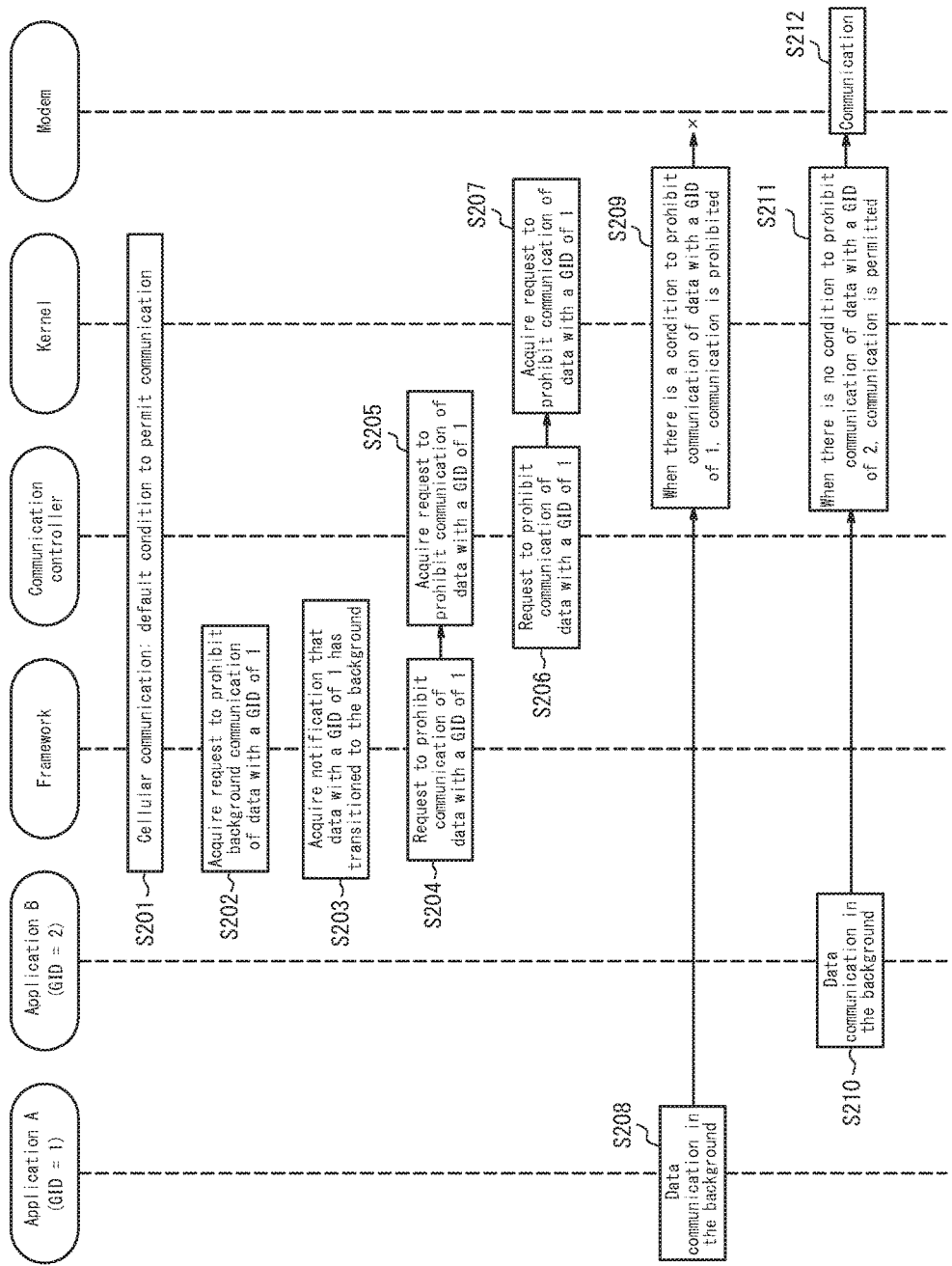
FIG. 6 illustrates the sequence of filtering according to Embodiment 2.

FIG. 6 illustrates the sequence of filtering according to this embodiment. A description of the application A 16a, application B 16b, framework, communication controller, kernel, and modem 112 is the same as in FIG. 4 of Embodiment 1 and is therefore omitted.

In FIG. 6, even when an application running in the background transmits data, data communication by cellular communication is permitted by default (step S201). In other words, as a filtering condition, a default condition to permit communication is set for data transmitted from an application running in the background.

Next, the framework acquires a request to prohibit data communication for data with a GID of 1 in the case of the application A 16a running in the background (hereinafter, also referred to as request to prohibit communication of data with a GID of 1) (step S202). At this point in time, the application A 16a is not running in the background, and therefore the condition to prohibit communication for data with a GID of 1 is not set.

Next, the framework acquires notification that the application A 16a has transitioned to running in the background (hereinafter, also referred to as background transition notification) (step S203). After receiving the notification, the framework outputs the request to prohibit communication of data with a GID of 1 to the communication controller (step S204).

The communication controller acquires the request to prohibit communication of data with a GID of 1 (step S205). Next, the communication controller outputs the request to prohibit communication of data with a GID of 1 to the kernel (step S206).

The kernel acquires the request to prohibit communication of data with a GID of 1 (step S207). With the above operations in steps S202 to S207, the request to prohibit communication of data with a GID of 1 is conveyed to the kernel. In other words, as a filtering condition, a condition to prohibit communication for data with a GID of 1 is set.

Next, when the application A 16a issues a request for data communication while running in the background (step S208), the kernel prohibits the data communication, since the kernel recognizes that the condition to prohibit communication for data with a GID of 1 is set (step S209).

Conversely, when the application B 16b with a GID of 2 requests data communication while running in the background (step S210), the kernel recognizes that a condition to prohibit communication for data with a GID of 2 is not set. Accordingly, based on the default condition to permit communication, the kernel permits data communication (step S211). The modem 112 then performs data communication to transmit the data with a GID of 2 to the network (step S212).

Filtering according to Embodiment 2 has been described above. With the filtering according to this embodiment, prohibition of data communication can be set by designating the GID. A different type of filtering could allow prohibition of data communication to be set by designating the UID. Since the GID indicates a broader range than the UID, however, a method that designates the GID allows prohibition of data communication by an application to be set more easily than a method that designates the UID.

In Embodiments 1 and 2, a method for permitting or prohibiting data communication via a cellular communication method using the modem 112 as the I/F device 111 has mainly been described. The I/F device 111 is not limited to the modem 112, however, and may be the wireless LAN device 113 or the like. In other words, the control method for data communication of the communication apparatus 1 according to Embodiments 1 and 2 is not limited to data communication with a cellular communication method and may also be applied to data communication with another communication method, such as a wireless LAN communication method.

The filtering according to Embodiments 1 and 2 is performed for data communication of an application running in the background, but filtering is not limited to this case and may be performed for data communication of an application running in the foreground. In other words, the filtering according to Embodiments 1 and 2 may determine whether to permit or prohibit data communication for data transmitted by an application running in the foreground.

Embodiment 3

As has been described so far, in Embodiments 1 and 2, it is determined whether to permit or prohibit data communication for data transmitted from an application based on the GID associated with the data. In Embodiment 1, the communication method with which the communication interface 11 connects to the network has been described mainly as a cellular communication method. As Embodiment 3, the case of the communication interface 11 appropriately selecting between the modem 112 and the wireless LAN device 113 as the I/F device 111 is described.

Figure 7:
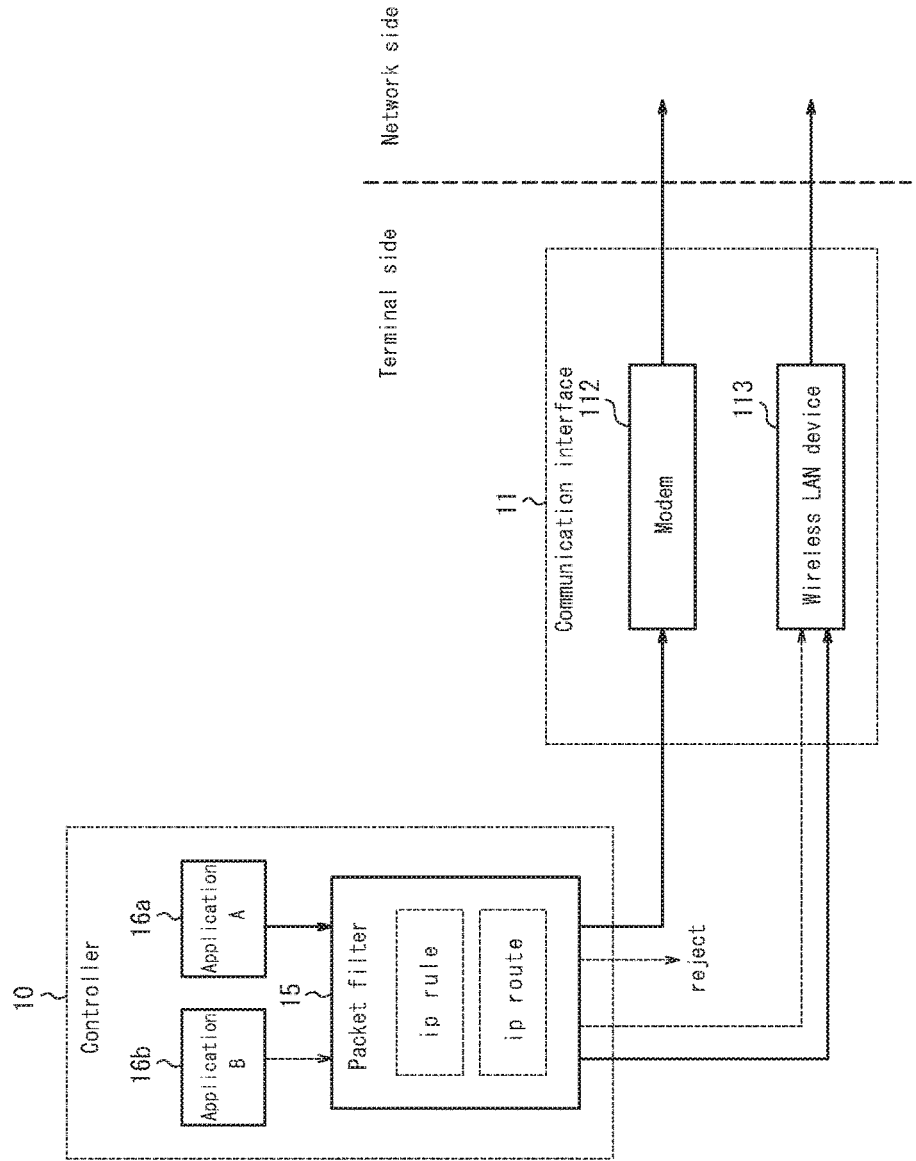
FIG. 7 is a block diagram illustrating an example of the flow of data according to Embodiment 3.

FIG. 7 is a block diagram illustrating an example of the flow of data according to this embodiment. Like the configuration illustrated in FIG. 3, the controller 10 and the communication interface 11 are provided in the configuration illustrated in FIG. 7. In FIG. 7, the communication interface 11 is provided with the modem 112 and the wireless LAN device 113. The communication interface 11 appropriately selects and uses one of the modem 112 and the wireless LAN device 113 to perform data communication with the network.

In FIG. 7, as in FIG. 3, the flow of data transmitted from the application A 16a is indicated by solid lines, whereas the flow of data transmitted from the application B 16b is indicated by dashed lines. Furthermore, in FIG. 7, the packet filter 15 determines whether to permit data communication based on filtering conditions in each of the cases of the I/F device 111 being the modem 112 and being the wireless LAN device 113.

The filtering conditions according to this embodiment include a condition to prohibit data communication by default when the I/F device 111 is the modem 112 and the communication with the network is by cellular communication. The filtering conditions according to this embodiment also include a condition to permit communication for data transmitted from the application A 16a. The example of the flow of data illustrated in FIG. 7 is based on these filtering conditions.

When the I/F device 111 is the modem 112, the packet filter 15 prohibits data communication for data transmitted from the application B 16b based on the filtering conditions and does not output the data to the modem 112. In FIG. 7, the flow of data for this operation is indicated by the dashed arrow pointing from the packet filter 15 towards the word "reject".

Also, based on the filtering conditions, the packet filter 15 does not prohibit data communication for data transmitted from the application A 16*a* and outputs the data to the modem 112. In FIG. 7, the flow of data for this operation is indicated by the solid arrow pointing from the packet filter 15 towards the modem 112.

When the I/F device 111 is the wireless LAN device 113, the packet filter 15 does not prohibit data communication for data transmitted from the application A 16*a* or data communication for data transmitted from the application B 16*b* and outputs the data to the wireless LAN device 113. In FIG. 7, the flow of data for this operation is indicated by the solid arrow and the dashed arrow pointing from the packet filter 15 towards the wireless LAN device 113.

Embodiment 3 has been described. As described above, the method of billing by the amount of data communicated may differ between a cellular communication method and a wireless LAN communication method. According to this embodiment, data communication by a cellular communication method and data communication via a wireless LAN communication method can be chosen between, and filtering conditions can be set in accordance with the method of billing.

Embodiment 4

As Embodiment 4, the communication apparatus 1 is further provided with a connection functional unit 17. The connection functional unit 17 is used when the communication interface 11 appropriately selects between the modem 112 and the wireless LAN device 113 as the I/F device 111.

In Embodiment 4, only data communication by cellular communication, which is typically a pay-as-you-go fee structure, is prohibited based on the GID. Data communication by a method that is typically not a pay-as-you-go fee structure, such as wireless LAN or Bluetooth® (Bluetooth is a registered trademark in Japan, other countries, or both), need not be prohibited based on the GID.

Apparatus Structure

Figure 8:
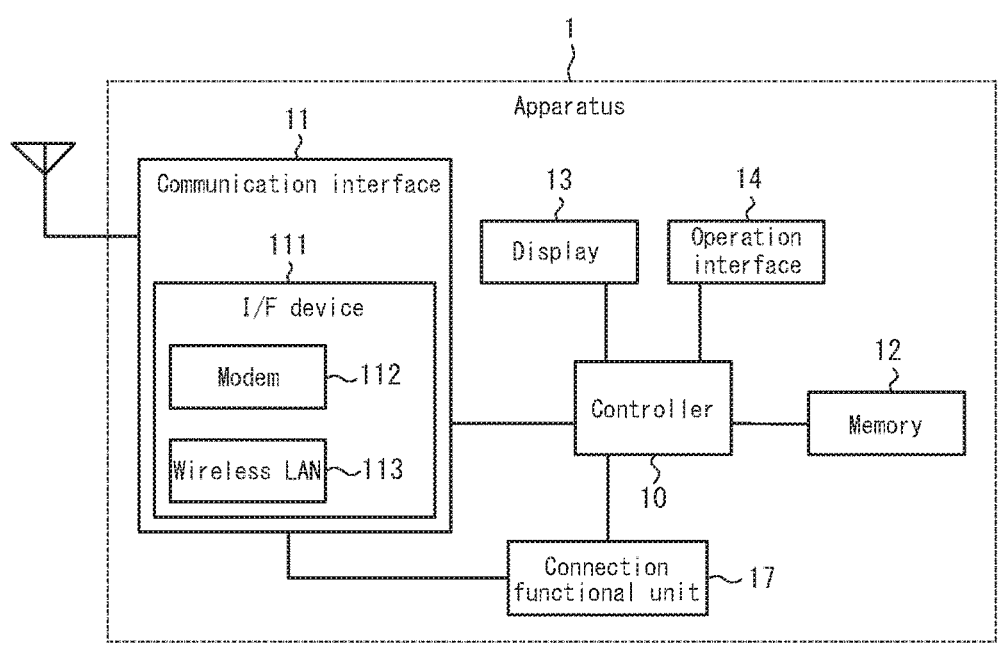
FIG. 8 is a functional block diagram schematically illustrating an example of the structure of a communication apparatus according to Embodiment 4.

FIG. 8 is a functional block diagram schematically illustrating an example of the structure of the communication apparatus 1 according to Embodiment 4. As compared to FIG. 1, the communication apparatus 1 illustrated in FIG. 8 further includes the connection functional unit 17.

The connection functional unit 17 is connected to the controller 10 and the communication interface 11. The connection functional unit 17 is controlled by the controller 10. The connection functional unit 17 outputs information to the communication interface 11 indicating whether to use the modem 112 or the wireless LAN device 113 to connect to the network.

The connection functional unit 17 also acquires information pertaining to whether communication with the network in the communication interface 11 is being performed using the modem 112 or using the wireless LAN device 113. In other words, the connection functional unit 17 acquires information pertaining to whether the I/F device 111 in FIG. 3 is the modem 112 or the wireless LAN device 113.

In this embodiment, the controller 10 is provided with an application functional unit and a data service functional unit. The connection functional unit 17 may be included in the controller 10.

The application functional unit implements a user interface when an application is executed on the communication apparatus 1. The application functional unit also manages permission for data communication or prohibition of data communication for each application and notifies the connection functional unit 17 of information pertaining to permission for data communication or prohibition of data communication. In response to a change in the state of each application, the application functional unit also determines whether to notify the connection functional unit 17.

The connection functional unit 17 notifies the data service functional unit of the information, received from the application functional unit, pertaining to permission for data communication or prohibition of data communication.

Based on the information, received from the connection functional unit 17, pertaining to permission for data communication or prohibition of data communication, the data service functional unit sets (or adds, modifies, deletes, or the like) a condition to permit communication or a condition to prohibit communication as the filtering conditions referred to by the packet filter 15.

Control of Data Communication when a VPN Device is Provided

In this embodiment, the communication apparatus 1 is further provided with a VPN device 18. The VPN device 18 has a protocol to encapsulate acquired data. The protocol that the VPN device 18 has is allocated a unique UID. The UID allocated to the protocol is also referred to as the UID of the protocol. The VPN device 18 encapsulates data from an application based on this protocol. The VPN device 18 then outputs the encapsulated data to the communication interface 11. The encapsulated data lose the association with the UID allocated to the application transmitting the data. The UID of the protocol that encapsulated the data is then newly associated with the encapsulated data.

The VPN device 18 may have a plurality of protocols to encapsulate data. In this case, the UIDs of these protocols differ. The UID of the protocol that encapsulates data is associated with the encapsulated data. When the VPN device 18 has a plurality of protocols to encapsulate data, the UIDs of these protocols belong to a common group. A GID is allocated to this common group. Accordingly, a common GID is associated with the plurality of protocols that the VPN device 18 has. Hereinafter, the GID associated in common with the plurality of protocols that the VPN device 18 has is also referred to as the GID of the VPN device 18. The GID of the VPN device 18 that has the protocol that encapsulated the data is newly associated with the encapsulated data. The protocol that the VPN device 18 has may be included in an application. In this case, the protocol that the VPN device 18 has is also referred to as a VPN application.

Figure 9:
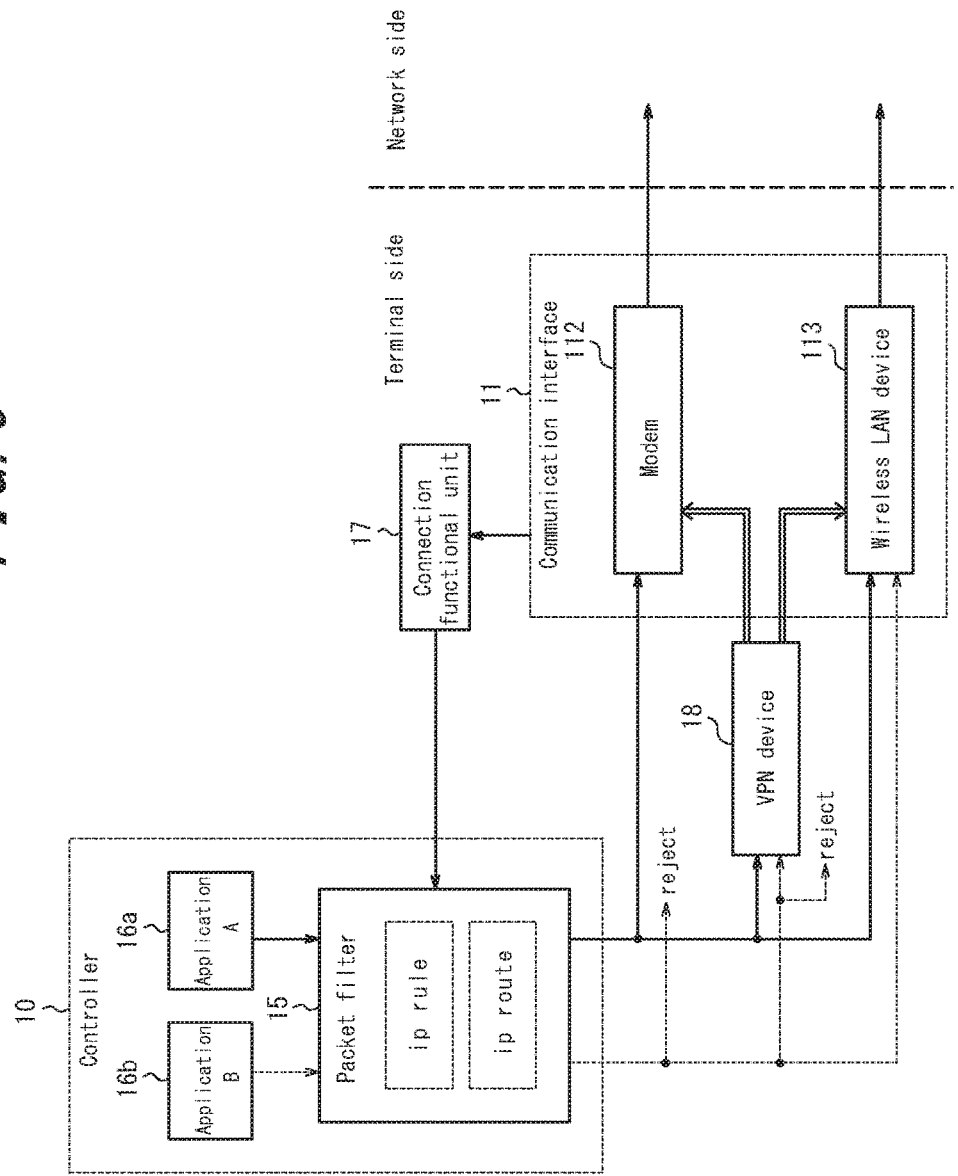
FIG. 9 is a block diagram illustrating an example of the flow of data according to Embodiment 4.

FIG. 9 is a block diagram illustrating the flow of data according to this embodiment. In FIG. 9, in addition to the structure of Embodiment 3 illustrated in FIG. 7, the connection functional unit 17 and the VPN device 18 are further provided. In FIG. 9, since the flow of data that traverses a path that directly connects the packet filter 15 to the communication interface 11 is the same as in FIG. 7, a description thereof is omitted.

In FIG. 9, the connection functional unit 17 acquires information from the communication interface 11 pertaining to whether the I/F device 111 is the modem 112 or the wireless LAN device 113. Based on the information acquired from the communication interface 11, the connection functional unit 17 sets filtering conditions referred to by the packet filter 15.

Figure 10:
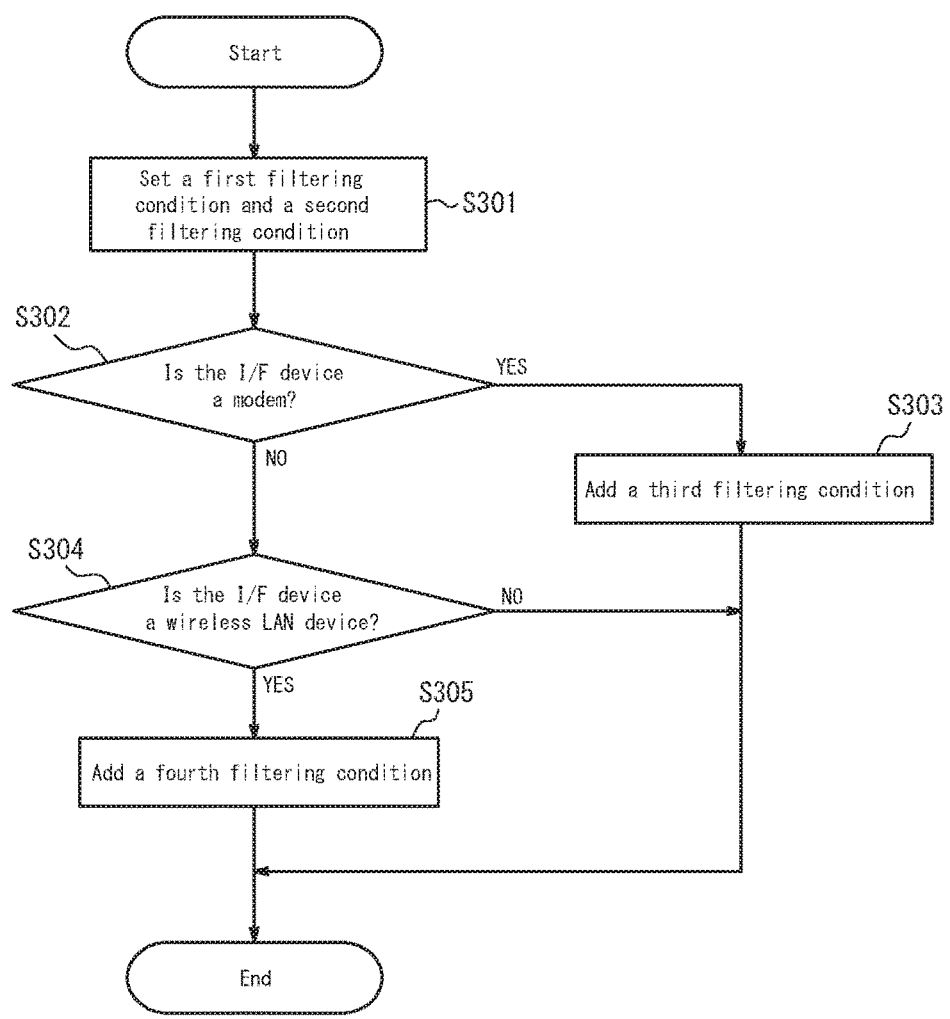
FIG. 10 is a flowchart illustrating an example of operation of a connection functional unit.

FIG. 10 is a flowchart illustrating operation of the connection functional unit 17. First, the connection functional unit 17 sets a first filtering condition always to permit data communication for data with which the GID of the VPN device 18 is associated and a second filtering condition to prohibit transmission of data from an application to the VPN device 18 (step S301).

By the first filtering condition, data communication is permitted for data encapsulated in the VPN device 18, regardless of which application transmitted the data. Also, data communication is permitted for data encapsulated by the VPN device 18 regardless of whether the I/F device 111 is the modem 112 or the wireless LAN device 113.

On the other hand, with the second filtering condition, data transmitted from the application is not transmitted to the VPN device 18 and is not encapsulated. Upon combining the first and second filtering conditions, data transmitted from an application are not encapsulated by the VPN device 18.

Here, in order to encapsulate data transmitted from an application designated by the user (data with a GID designated by the user) in the VPN device 18 and transmit the data to the network, it is necessary to set another filtering condition to permit transmission of data to the VPN device 18. The setting of this filtering condition is performed in steps S302 to S305 below.

After step S301, the connection functional unit 17 acquires information pertaining to the I/F device 111 from the communication interface 11 and determines whether the I/F device 111 is the modem 112 (step S302).

When the I/F device 111 is the modem 112 (step S302: YES), the connection functional unit 17 adds a third filtering condition to permit transmission of data from the application A 16a to the VPN device 18 (step S303). By the third filtering condition, data transmitted from the application A 16a are transmitted to the VPN device 18 and encapsulated. Furthermore, by the first filtering condition, data communication of data encapsulated by the VPN device 18 is permitted. Therefore, the data transmitted from the application A 16a are encapsulated, and transmission thereof to the network is permitted. Subsequently, the connection functional unit 17 ends the processing of the flowchart in FIG. 10.

When the I/F device 111 is not the modem 112 (step S302: NO), the connection functional unit 17 determines whether the I/F device 111 is the wireless LAN device 113 (step S304).

When the I/F device 111 is the wireless LAN device 113 (step S304: YES), the connection functional unit 17 adds a fourth filtering condition to permit transmission of data from applications to the VPN device 18 (step S305). Subsequently, the connection functional unit 17 ends the processing of the flowchart in FIG. 10.

Here, the applications include the application A 16a and the application B 16b. Therefore, by the fourth filtering condition, transmission of data transmitted from either application to the VPN device 18 is permitted. As a result, when the I/F device 111 is the wireless LAN device 113, permission is granted for data transmitted from any application to be encapsulated and transmitted to the network.

When the I/F device 111 is not the wireless LAN device 113 (step S304: NO), the connection functional unit 17 ends the processing of the flowchart in FIG. 10.

Operations of the connection functional unit 17 have been described with reference to FIG. 10. The flow of data under the filtering conditions set by these operations corresponds to the flow of data illustrated in FIG. 9. This correspondence is described below.

In FIG. 9, the solid arrow pointing from the packet filter 15 towards the VPN device 18 indicates the flow of data based on the third filtering condition (condition to permit transmission of data from the application A 16a to the VPN device 18). The solid arrow also indicates the flow of data based on the fourth filtering condition (condition to permit transmission of data from the application A 16a and the application B 16b to the VPN device 18).

In FIG. 9, the dashed arrow from the packet filter 15 to the VPN device 18 diverges before the VPN device 18. One of the branches goes towards the VPN device 18, whereas the other branch goes towards the word "reject". The dashed arrow that goes towards the VPN device 18 indicates the flow of data based on the fourth filtering condition. The dashed arrow that goes towards the word "reject" indicates the flow of data based on the third filtering condition. In other words, it is determined whether to transmit the data transmitted from the application B 16b, the flow of which is indicated by the dashed arrows, to the VPN device 18 based on whether the I/F device 111 is the modem 112 or the wireless LAN device 113.

Figure 11:
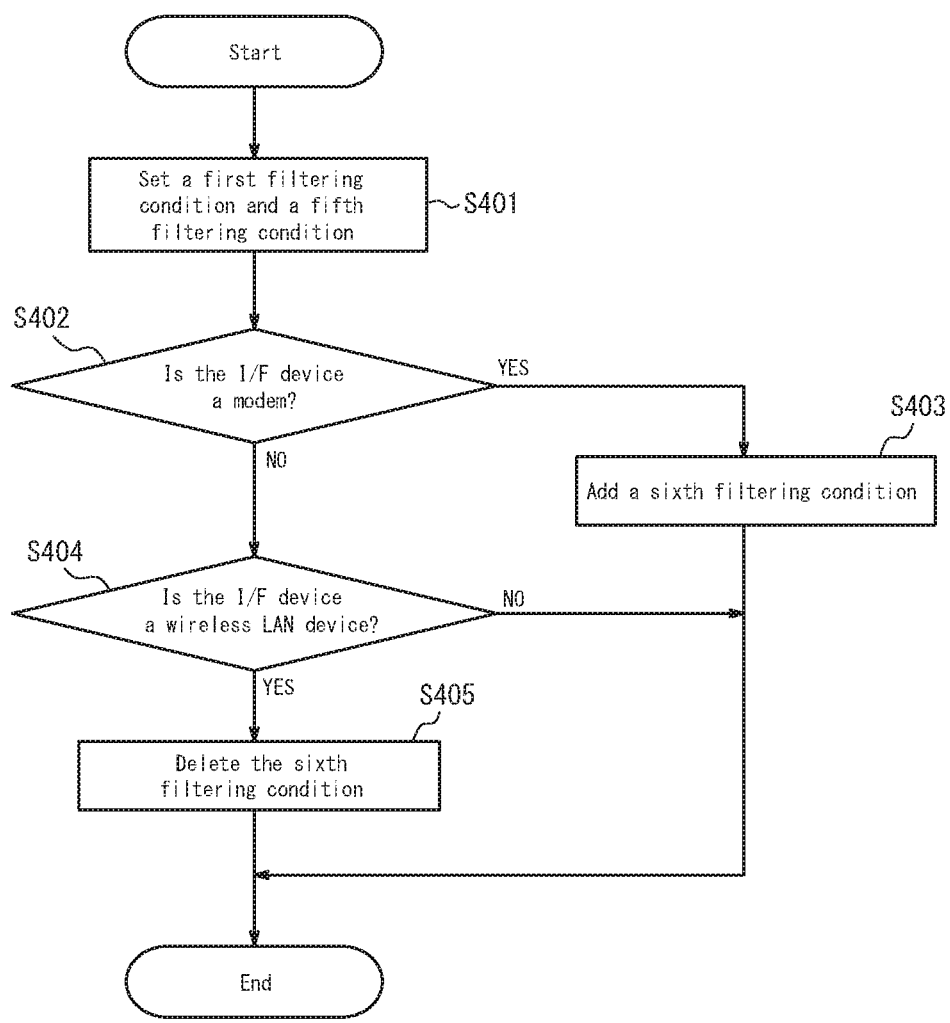
FIG. 11 is a flowchart illustrating an example of operation of the connection functional unit.

The flow of data illustrated in FIG. 9 is implemented based on the filtering conditions set in the flowchart of FIG. 10. The flow of data illustrated in FIG. 9 may, however, be implemented by filtering conditions that differ from those in FIG. 10. FIG. 11 is a flowchart for setting filtering conditions that differ from those in FIG. 10.

The following describes the flowchart illustrated in FIG. 11. First, the connection functional unit 17 sets a first filtering condition always to permit data communication for data with which the GID of the VPN device 18 is associated and a fifth filtering condition to permit transmission of data from an application to the VPN device 18 (step S401). The first filtering condition is the same as the first filtering condition set in step S301 of FIG. 10. As compared to the second filtering condition set in step S301 of FIG. 10, the fifth filtering condition differs by not prohibiting but rather permitting transmission of data.

By the first filtering condition, data communication is permitted for data encapsulated in the VPN device 18, regardless of which application transmitted the data. Also, data communication is permitted for data encapsulated by the VPN device 18 regardless of whether the I/F device 111 is the modem 112 or the wireless LAN device 113.

By the fifth filtering condition, data transmitted from an application are transmitted to the VPN device 18 and encapsulated by default. Upon combining the first and fifth filtering conditions, data transmitted from an application are encapsulated in the VPN device 18 by default.

Here, in order for data transmitted from an application designated by the user (data with a GID designated by the user) not to be transmitted to the VPN device 18 and not to be encapsulated, it is necessary to set another filtering condition to prohibit transmission of data to the VPN device 18. The setting of this filtering condition is performed in steps S402 to S405 below.

After step S401, the connection functional unit 17 acquires information pertaining to the I/F device 111 from the communication interface 11 and determines whether the I/F device 111 is the modem 112 (step S402).

When the I/F device 111 is the modem 112 (step S402: YES), the connection functional unit 17 adds a sixth filtering condition to prohibit transmission of data from the application B 16b to the VPN device 18 (step S403). As a result, data transmitted from the application B 16b are not transmitted to the VPN device 18 and are not encapsulated. Accordingly, data communication for data transmitted from the application B 16b is not permitted. On the other hand, transmission to the VPN device 18 is not prohibited for data transmitted from the application A 16a. Accordingly, encapsulation and transmission to the network are permitted for the data transmitted from the application A 16a. Subsequently, the connection functional unit 17 ends the processing of the flowchart in FIG. 11.

When the I/F device 111 is not the modem 112 (step S402: NO), the connection functional unit 17 determines whether the I/F device 111 is the wireless LAN device 113 (step S404).

When the I/F device 111 is the wireless LAN device 113 (step S404: YES), the connection functional unit 17 deletes the sixth filtering condition (step S405). Deletion of the sixth filtering condition is limited to the case of when the sixth filtering condition had been added. As a result, transmission to the VPN device 18 is also not prohibited for data transmitted from the application B 16b. Accordingly, like the data transmitted from the application A 16a, encapsulation and transmission to the network are permitted for the data transmitted from the application B 16b. In other words, when the I/F device 111 is the wireless LAN device 113, permission is granted for data transmitted from any application to be encapsulated and transmitted to the network. Subsequently, the connection functional unit 17 ends the processing of the flowchart in FIG. 11.

When the I/F device 111 is not the wireless LAN device 113 (step S404: NO), the connection functional unit 17 ends the processing of the flowchart in FIG. 11.

The flow of data under the filtering conditions set by the operations of the connection functional unit 17 described with reference to FIG. 11 corresponds to the flow of data illustrated in FIG. 9. This correspondence is described below.

In FIG. 9, the solid arrow from the packet filter 15 to the VPN device 18 indicates the flow of data based on the fifth filtering condition.

In FIG. 9, the dashed arrow from the packet filter 15 to the VPN device 18 diverges before the VPN device 18. One of the branches goes towards the VPN device 18, whereas the other branch goes towards the word "reject". The dashed arrow that goes towards the VPN device 18 indicates the flow of data based on the fifth filtering condition (condition to permit transmission of data by default). The dashed arrow that goes towards the word "reject" indicates the flow of data based on the sixth filtering condition (condition to prohibit transmission of data from the application B 16b to the VPN device 18). In other words, it is determined whether to transmit the data transmitted from the application B 16b, the flow of which is indicated by the dashed arrow, to the VPN device 18 based on whether the I/F device 111 is the modem 112 or the wireless LAN device 113.

With the filtering according to this embodiment described thus far, transmission of data to the VPN device 18 can be controlled based on information that the connection functional unit 17 acquires from the communication interface 11. Accordingly, even when data are encapsulated by the VPN device 18 and the GID of the data changes, data transmission can easily be permitted or prohibited based on the GID allocated to the application. The following describes filtering according to Comparative Examples of this embodiment.

Comparative Example 1

Figure 12:
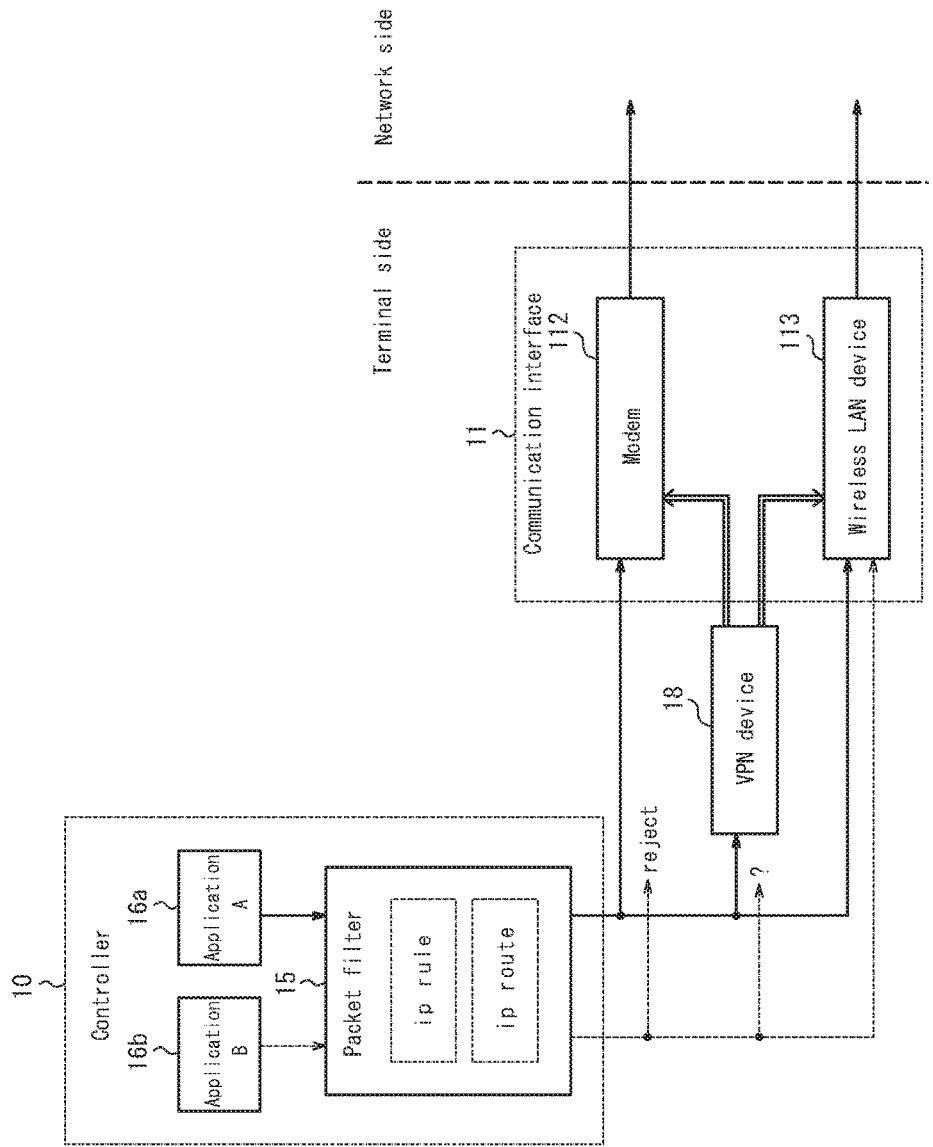
FIG. 12 illustrates the flow of data according to Comparative Example 1 of Embodiment 4.

FIG. 12 illustrates the flow of data according to Comparative Example 1 of this embodiment. In FIG. 12, as in FIG. 7, the flow of data transmitted from the application A 16a is indicated by solid lines, whereas the flow of data transmitted from the application B 16b is indicated by dashed lines. The path over which data in FIG. 12 flow includes not only a path that directly connects the packet filter 15 to the communication interface 11, but also a path that connects the packet filter 15 to the communication interface 11 via the VPN device 18. Data that are output from the VPN device 18 and with which the GID of the VPN device 18 is associated are indicated by double-lined arrows. In FIG. 12, since the flow of data that traverses a path that directly connects the packet filter 15 to the communication interface 11 is the same as in FIG. 7, a description thereof is omitted.

In FIG. 12, along the path over which data flow from the packet filter 15 to the communication interface 11 via the VPN device 18, the packet filter 15 determines whether to output data to the VPN device 18 before the data are encapsulated. As compared to FIG. 9, in FIG. 12, the packet filter 15 cannot judge whether data encapsulated by the VPN device 18 are ultimately output to the modem 112 or output to the wireless LAN device 113. Accordingly, the packet filter 15 cannot determine whether to output the data of the application B 16b to the VPN device 18.

Comparative Example 2

Figure 13:
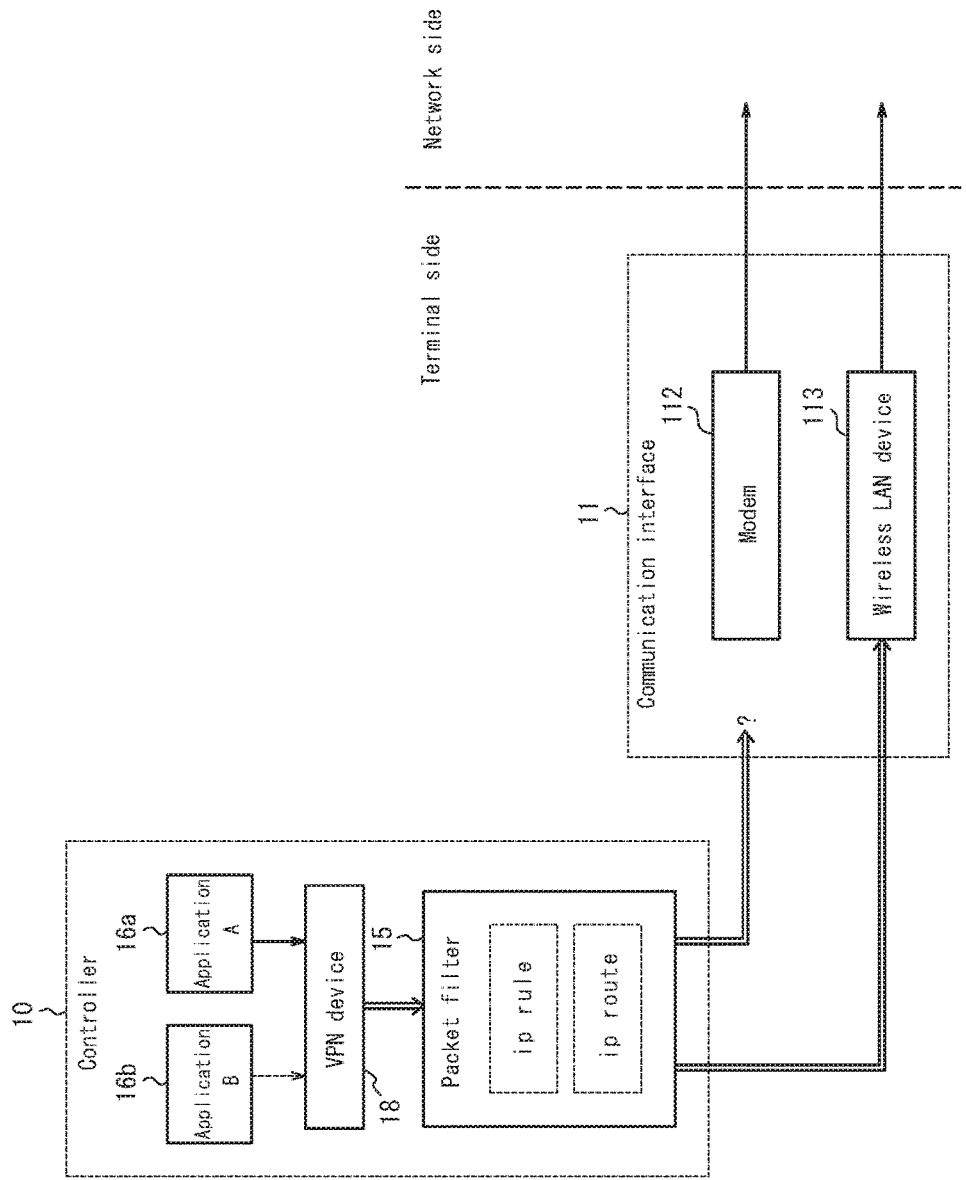
FIG. 13 illustrates the flow of data according to Comparative Example 2 of Embodiment 4.

FIG. 13 illustrates the flow of data according to Comparative Example 2 of this embodiment. In FIG. 13, as in FIGS. 7 and 12, the flow of data transmitted from the application A 16a is indicated by a solid line, whereas the flow of data transmitted from the application B 16b is indicated by a dashed line. In FIG. 13, as in FIG. 12, data that are output from the VPN device 18 and with which the GID of the VPN device 18 is associated are indicated by double lines. In FIG. 13, the VPN device 18 is connected between the applications A 16a and B 16b and the packet filter 15. In other words, along the path over which data in FIG. 13 flow, the packet filter 15 determines whether to output data to the communication interface 11 after the data transmitted from the application are encapsulated.

In FIG. 13, unlike FIG. 12, the packet filter 15 directly outputs data to the I/F device 111 of the communication interface 11 and therefore can judge whether the I/F device 111 that is the recipient of the output data is the modem 112 or the wireless LAN device 113.

In this case, however, the UID of the protocol that encapsulates the data in the VPN device 18 is associated with the data input into the packet filter 15. Also, the GID of the VPN device 18 is associated with the data input into the packet filter 15. In other words, neither the UID of the application A 16a nor the UID of the application B 16b is associated with the data input into the packet filter 15. Also, the GID of the group to which these UIDs belong is not associated with the data input into the packet filter 15. Accordingly, the packet filter 15 cannot judge whether the data were transmitted from the application A 16a or from the application B 16b. That is, the packet filter 15 cannot judge whether data transmission should have been permitted or prohibited for the data before encapsulation. As a result, when the I/F device 111 is the modem 112, the packet filter 15 cannot determine whether to output data from the application to the modem 112.

On the other hand, when the I/F device 111 is the wireless LAN device 113, the packet filter 15 determines that data from the application may be output to the wireless LAN device 113 and can output the data.

The flow of data, i.e. the control of data communication, in this embodiment, Comparative Example 1, and Comparative Example 2 has been described. With the control of data communication according to this embodiment, even when data are encapsulated in the VPN device 18 and the GID of the data changes, data transmission can easily by permitted or prohibited based on the GID associated with the data.

Modification

As a modification, the following describes the case of the UID of the application that transmits data also belonging to the group to which belongs the data encapsulating protocol of the VPN device 18. In this case, the GID of the data transmitted by an application is the same as the GID of the data yielded by encapsulating the data. Hence, even when data are encapsulated, it can be determined whether to permit or prohibit data communication based on the GID associated with the data by applying the filtering described in Embodiments 1 and 2. In other words, a method that designates the GID in order to determine whether to permit or prohibit data communication allows easier setting of the permission or prohibition of data communication by an application than does a method that designates the UID.

The communication apparatus, communication control method, and non-transitory computer-readable recording medium according to embodiments of this disclosure allow the user easily to set permission or prohibition of data communication of an application.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. While this disclosure has been described focusing on apparatuses, this disclosure may also be embodied as a method that includes steps performed by the components of an apparatus. Furthermore, while this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

In the above embodiments, wireless LAN has been provided as an example of a data communication method that is not a pay-as-you-go method, but this example is not limiting. Other data communication methods that are not pay-as-you-go methods include Bluetooth® and Ethernet® (Ethernet is a registered trademark in Japan, other countries, or both).

The invention claimed is:

1. A communication apparatus comprising:
a controller configured to
prohibit data communication by default;
receive a request for data communication from an application; and
permit data communication of the application in accordance with an identifier (ID) of a group to which the application issuing the request belongs.

2. The communication apparatus of claim 1, wherein the application is a virtual private network (VPN) application.

3. The communication apparatus of claim 2, wherein the controller prohibits data communication by default when the data communication is cellular communication.

4. The communication apparatus of claim 3, wherein the controller permits data communication by default when the data communication is wireless local area network (LAN) communication.

5. The communication apparatus of claim 2, wherein the controller permits data communication by default when the data communication is wireless local area network (LAN) communication.

6. The communication apparatus of claim 1, wherein the controller prohibits data communication by default when the data communication is cellular communication.

7. The communication apparatus of claim 6, wherein the controller permits data communication by default when the data communication is wireless local area network (LAN) communication.

8. The communication apparatus of claim 1, wherein the controller permits data communication by default when the data communication is wireless local area network (LAN) communication.

9. A communication control method comprising:
on a communication apparatus,
prohibiting data communication by default;
receiving a request for data communication from an application; and
permitting data communication of the application in accordance with an identifier (ID) of a group to which the application issuing the request belongs.

10. The communication control method of claim 9, wherein the application is a virtual private network (VPN) application.

11. The communication control method of claim 10, further comprising:
prohibiting data communication by default when the data communication is cellular communication.

12. The communication control method of claim 11, further comprising:
permitting data communication by default when the data communication is wireless local area network (LAN) communication.

13. The communication control method of claim 10, further comprising:
permitting data communication by default when the data communication is wireless local area network (LAN) communication.

14. The communication control method of claim 9, further comprising:
prohibiting data communication by default when the data communication is cellular communication.

15. The communication control method of claim 14, further comprising:
permitting data communication by default when the data communication is wireless local area network (LAN) communication.

16. The communication control method of claim 9, further comprising:
permitting data communication by default when the data communication is wireless local area network (LAN) communication.

17. A non-transitory computer-readable recording medium including computer program instructions, which when executed by a computer functioning as a communication apparatus, cause the computer to:
- prohibit data communication by default;
- receive a request for data communication from an application; and
- permit data communication of the application in accordance with an identifier (ID) of a group to which the application issuing the request belongs.

* * * * *